Figure 1:
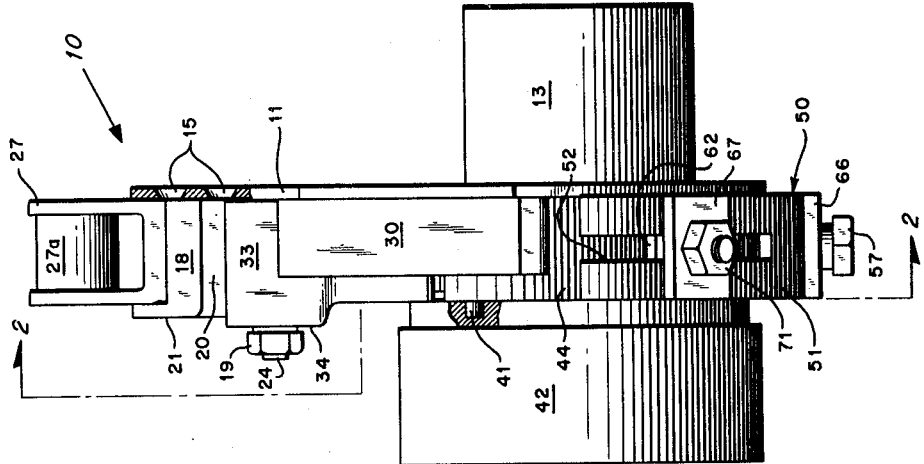

June 29, 1965  E. M. TODD ETAL  3,192,335
TORQUE SENSING SWITCH

Filed Jan. 30, 1963  2 Sheets-Sheet 1

INVENTORS
EUGENE M. TODD
THEODORE C. HERRING
FRANCIS X. DOYLE
BY
Henry Hansen
ATTORNEY

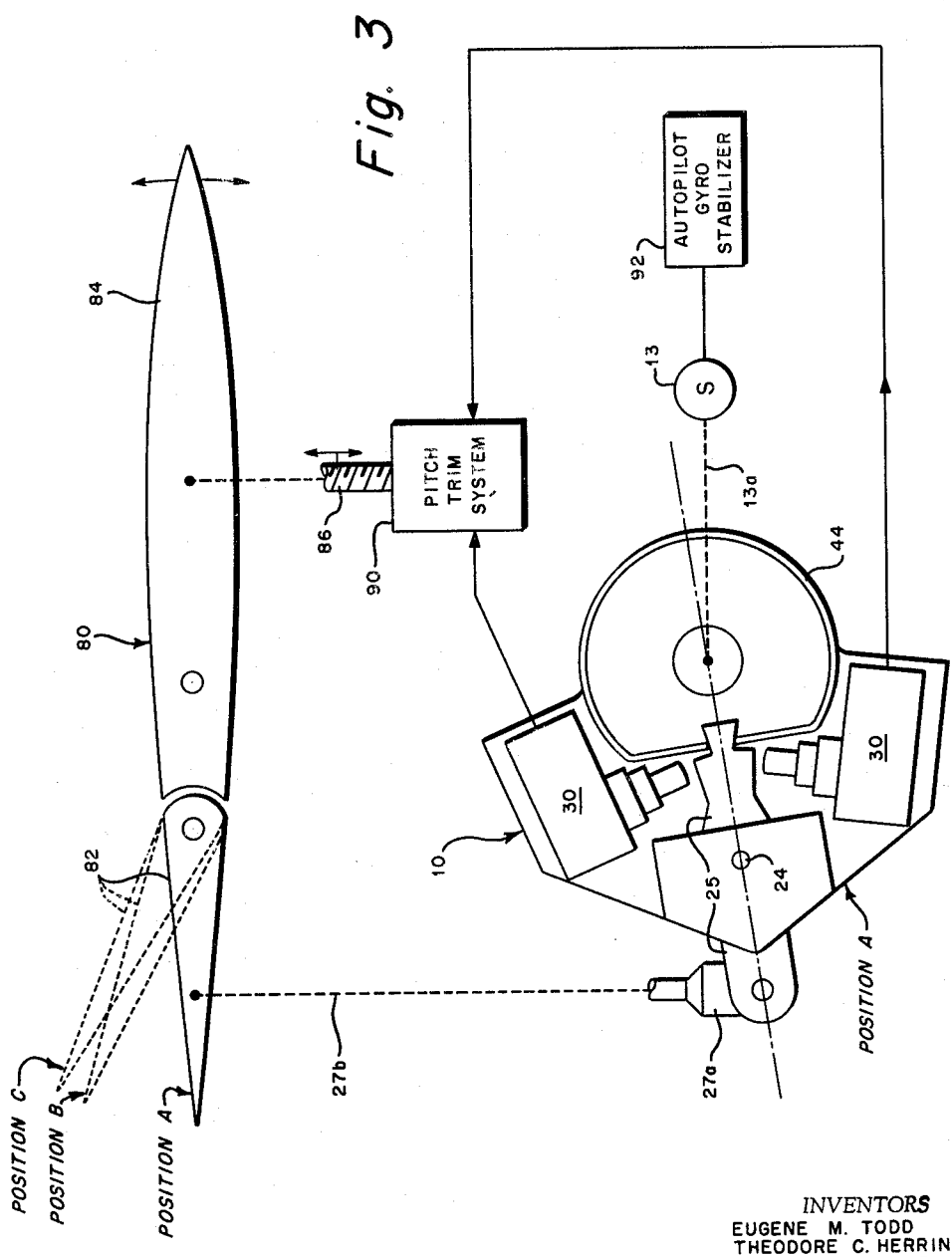

United States Patent Office 3,192,335
Patented June 29, 1965

3,192,335
TORQUE SENSING SWITCH
Eugene M. Todd, Doylestown, Theodore C. Herring, New Hope, and Francis X. Doyle, Warrington, Pa., assignors to the United States of America as represented by the Secretary of the Navy
Filed Jan. 30, 1963, Ser. No. 255,135
4 Claims. (Cl. 200—61.39)
(Granted under Title 35, U.S. Code (1952), sec. 266)

The invention described herein may be manufactured and used by or for the Government of the United States of America for governmental purposes without the payment of any royalties thereon or therefor.

This invention relates to a torque sensing device and more particularly to an electromechanical device for sensing overload torque applied to a rotating member.

In present automatic pilot systems, electric servo motors are used in conjunction with stabilizing systems to maintain the aircraft in trim, that is, in a fixed attitude with respect to the angle between its fore and aft axes and the horizontal. When the aircraft becomes out of trim, an autopilot gyro stabilizer feeds a correction voltage to a servo motor which moves the elevation control surfaces and places the aircraft back in trim. Changing the elevator control surface creates an unbalanced condition which results in forces being exerted upon these external control components. These forces revert back into the control system and may apply an overload torque to the servo motor.

Presently, systems consisting of electronic amplifier voltage unbalanced detectors and associated equipment are utilized to sense servo overload torque. These systems have been found to be both difficult to adjust due to the extreme sensitivity of electronic systems and unreliable under variable operating voltages, temperatures and vibration.

Accordingly it is an object of the present invention to overcome the above-noted and other disadvantages of prior art apparatus and devices by providing a simple, compact, inexpensive and reliable electromechanical overload torque sensing device capable of withstanding vibration, shock or extreme temperature changes.

It is a further object of the present invention to provide an electromechanical overload torque sensing device adapted for attachment to a rotating member such as one operated by an electric servo motor which is positive functioning, sensitive and of long life expectancy.

A still further object of the present invention is to provide an electromechanical overload torque sensing device which with standard bench settings and minor adjustments at installation will eliminate any further maintenance.

Figure 2:
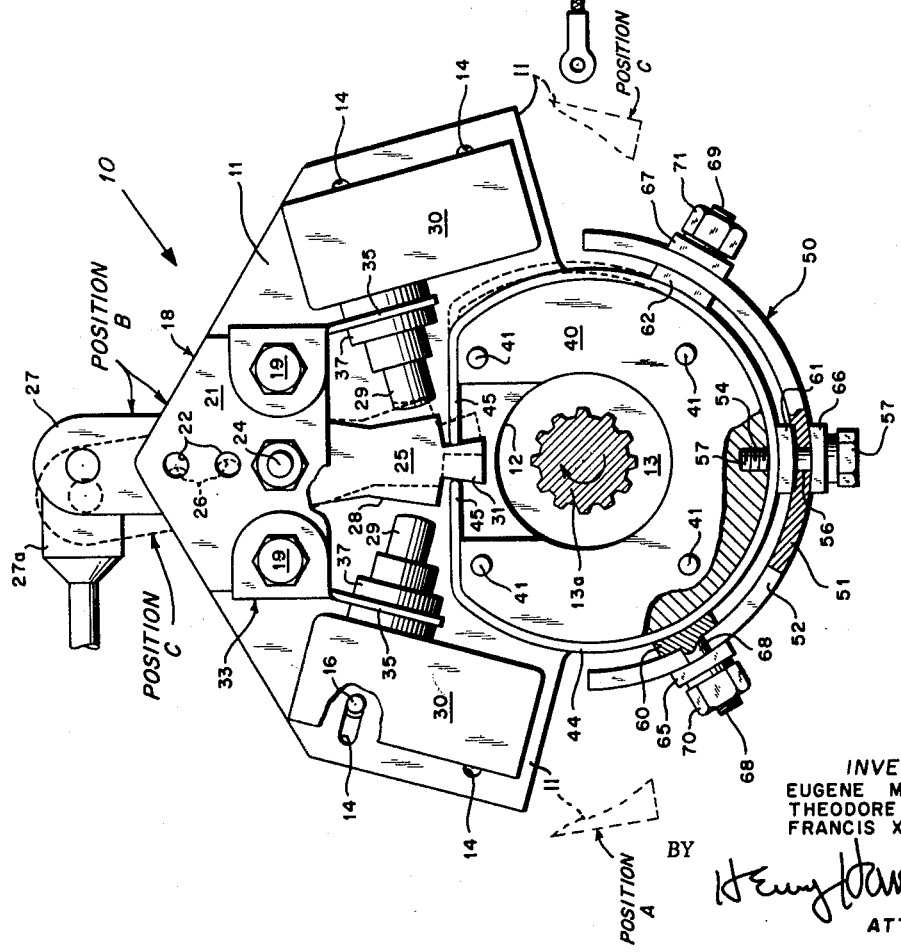

Other objetcs and many of the attendant advantages of this invention will be readily appreciated as the same becomes better understood by reference to the following detailed description when considered in connection with the accompanying drawings wherein:

FIG. 1 is a side elevation view of the torque sensing device of the present invention, FIG. 2 is a front elevation view of the torque sensing device taken along the section 2—2 of FIG. 1, having sections cut away to illustrate various components; and FIG. 3 is a schematic representation of an embodiment of the present invention being used with an aircraft control system.

Referring to FIGS. 1 and 2, it may be seen that the torque sensing device of the present invention generally noted at 10 comprises a plate or base member 11 containing various components of the invention thereon. The plate or base member 11 is of wedge shaped configuration and has at one end thereof an aperture 12 formed therein for receiving a splined shaft 13a such as that extending from a servo motor 13 and has elongated slots 14 formed on the edges of the base member 11 for adjustably receiving a pair of electric precision snap-acting switches 30 of the kind well known and used in the art. As illustrated in FIG. 3 switches 30 are operable to actuate a collateral pitch trim system 90 to be more clearly described below and forming no part of the present invention. Although in the embodiment shown the switches 30 actuate system 90 to alleviate the overload torque applied to the servo motor 13 it is understood that the switches may be used for other purposes. For example, the switches may actuate an alarm or other signal device to indicate the overload torque to the rotating operating member. The forward end of the base member 11 is provided with a plurality of longitudinally spaced holes 15 for adjustably receiving the pivot or lever arm 25. A channel-shaped block member 18 is secured to the forward end of the plate member by bolts 19 passing through the legs 20 of the block member and has its upper face 21 formed with a series of holes 22 which are in alignment with the holes 15 formed in the base member 11. The pivotal arm 25 is interposed between the legs 20 of the block member 18 and is also formed intermediate its ends with a series of longitudinally spaced holes 26 in alignment with the holes formed in the block member 18 and in the plate member 11 for receiving fulcrum bolt 24. The forward end of the pivot arm 25 has a clevis 27 connecting a linkage fitting 27a to the arm 25. As illustrated in FIGS. 1 and 3 link 27b extends from fitting 27a and acts as an operator for the external aircraft control component to be more fully described below. At the end remote from the clevis 27, pivot arm 25 is formed with angularly related faces 28 for engaging the contacts or plungers 29 of switch 30. The outer extremity of the pivot arm 25 has an outwardly flared nose 31 integrally formed thereon for engagement with a spring member 44, which will be described below.

The switches 30 are provided with additional support in the area of the plunger 29 by means of clips 33 having tabs 34 secured by means of the bolts 19 to the legs 20 of the block member 18. Wing sections 35 integrally constructed as part of the clips 33 are formed with apertures for receiving the sleeve member 37 surrounding the plunger 29 of switch 30 and have conventional means, not shown, to rigidly secure the switch 30 to the wings 35.

Referring again to FIGS. 1 and 2 there is seen a C-shaped spacer element generally noted as 40 which partially surrounds the shaft-receiving aperture 12 in the base member 11 and is rigidly secured to the plate 11 by means of a plurality of bolts 41 extending through the spacer element body 40 and threadably received within the openings formed in the servo disconnect 42, a structure commercially used and known in the prior art. A flat spring 44 of beryllium copper sheeting or other appropriate material is shaped to fit snuggly about the C-shaped element 40 and to have its end portions 45 extending beyond the confines of the C-shaped member 40 for engaging the outwardly flared nose 31 of the lever arm 25.

In order to adjust the tension in the spring member 44 and to thereby establish the amount of torque to be taken by the servo motor 13 before the collateral pitch control system 90 is actuated, an adjusting mechanism generally noted at 50 is connected to the torque sensing device. This adjusting mechanism comprises a semi-circular support 51 of flat stock having a width equal to the width of the spacer 40 and flat spring 44 and which in turn includes a pair of elongated adjustment slots 52 extending about the semicircular support 51 at the ends thereof. Intermediate the ends of the spacer elements 40 and the support 51 are aligned apertures 54 and 56, respectively; aperture 54 in the spacer element 40 being tapped for receiving bolt 57.

The radius of the semicircular support 51 is greater than that of the spring member 44 and the space thereby provided is filled by a plurality of inner pads or arcuate segments 60, 61 and 62, the outer faces of which have a curvature conforming to that of the support 51 and inner faces conforming to that of spring 44. It should be noted that the segment 61 is fixed with respect to the support 51 since the bolt 57 passes therethrough and is threadably anchored in the aperture 54 in spacer 40.

Outer arcuate segments 65, 66 and 67, similar to the inner segments, are additionally provided; the segment 66 being fixed relative to the support 51 by the bolt means 57 passing therethrough. Each of the inner segments 60 and 62 have an outwardly extending, integrally formed bolt 68 and 69 which are secured to their outer faces by tack-welding or other appropriate means and which extends through the elongated slots 52, the apertures in outer segments 65 and 67 and are threadably engaged by nut means 70 and 71.

It is readily observed that when the nuts 70, 71 are loosened, the movable pad assemblies 60–65–68 and 62–67–69 are slidable from a position adjacent the fixed pad assembly 61–66–57 to a position 90 degrees removed from the fixed pad assembly. By changing the arcuate position of the pad assemblies, the moment arm and thereby the resilience of the spring 44 may be adjusted and varied to conform to a preset load.

It is readily seen that adjustments within the device 10 are accomplished by one of three means or a combination thereof: First, the lever arm fulcrum bolt 24 may be positioned at one of three locations to provide the ratio of small input travel to larger output travel at the switch 30, thus producing sensitivity with a small amount of mechanical lost motion. Second, by moving the pad assemblies about the support 51. And lastly, by positioning the switches 30 relative to the pivot arm 25 when the same is in its neutral position.

FIG. 3 illustrates one of the many uses to which the novel torque sensing switch assembly 10 may be utilized. It is understood that the above-described torque sensing switch may be used in many environments and that the disclosure thereof with the automatic pilot system is exemplary, illustrative and not limiting. In FIG. 3 the external aircraft control surface is indicated generally at 80 and is a portion of an aircraft not shown. The external control component 80 includes an elevator control surface 82 connected to the flat slab or horizontal tail surface 84. Elevator 82 is controlled through linkage 27b while the horizontal tail surface 84 has the attitude thereof controlled through jack screw 86 which, in turn, is operated by the collateral pitch trim system generally indicated at 90. Pitch trim system 90 is actuated by switches 30 and will rotate the jack screw 86 in a direction determined by the particular switch 30 actuated by pivot arm 25. Movement of slab 84 in the proper direction helps the elevator 82 trim the aircraft by accepting part of the load applied to the elevator in the attempt thereof to trim the aircraft. It is a pitch trim system 90 therefore which relieves the overload torque on servo motor 13. An autopilot gyro stabilizer 92, also part of the aircraft, provides a signal to servo motor 13 in response to an unstable condition of the aircraft. Servo motor 13 is connected to the torque sensing device 10 through servo motor shaft 13a and it is this assembly 10 which senses any overload torque applied to the servo motor 13. Lever arm 25 formed as part of assembly 10 is connected to the elevator control surface by linkage 27b.

A more detailed description of the operation of FIGS. 1 and 2 with respect to FIG. 3 is as follows: When the aircraft is in trim and prior to receiving any error or correction signal from the gyro stabilizer 92 the servo motor 13 and associated shaft 13a may station the assembly 10 in the position indicated by position A. This position is shown in broken line in FIG. 2 and in solid line in FIG. 3. Upon receipt of a correction signal from the gyro stabilizer 92 the servo motor 13 rotates shaft 13a in the direction of the arrow indicated on the shaft of FIG. 2. As viewed in FIG. 2, the initial rotation of shaft 13a causes the assembly 10 to proceed from the broken line position A to the solid line position B. During this rotation linkage 27b causes initial movement of the elevator control surface 82 to position B by reason of the force from the rotating shaft 13a being transmitted through plate 11, fulcrum bolt 24, pivot arm 25 and connector 27a. It should be understood that the forces tending to resist movement of the elevator control surface are initially insufficient to deflect spring 44 and therefore the pivot arm 25 maintains its approximately centered location as indicated in the solid line position B of FIG. 2. Continued rotation of assembly 10 beyond position B toward position C further changes the attitude of the elevator control surface 82. This surface begins to receive a significant air pressure acting as a force to restrict further movement thereof. This force applied to surface 82 reverts back through the assembly 10 and tends to restrict further rotation of servo shaft 13a which thereby begins to load the servo motor 13. Continued rotation of shaft 13a additionally loads the servo motor 13 and due to the tendency of surface 82 and the attached linkage 27b to stay in a fixed position, pivot arm 25 attempts to rotate about fulcrum 24. At a preset and predetermined torque load the spring 44 begins to deflect toward the dotted line position C and continued rotation of shaft 13a through servo motor 13 causes the spring 44 to deflect to the point where pivot arm 25 initiates switch 30. Switch 30 then energizes the collateral pitch trim 90 which moves the horizontal tail surface 84 to thereby relieve the forces applied to control surface 82 and thereby relieve the torque applied to servo motor 13. Therefore, it may be stated that assembly 10 acts in such a manner as to sense when a preset and predetermined loading is being applied to the servo motor and when the load upon this motor reaches the preset and predetermined value a collateral system is energized to relieve the servo motor.

It will be understood that various changes in the details, materials, steps and arrangements of part, which have been herein described and illustrated in order to explain the nature of the invention, may be made by those skilled in the art within the principle and scope of the invention as expressed in the appended claims.

What is claimed is:

1. A torque sensing device for a rotatable shaft comprising:
   a base member having means thereon and adapted to be rigidly attached to the rotatable shaft for rotation therewith,
   a plurality of longitudinally spaced apertures formed in said member,
   a lever arm having a plurality of holes intermediate the ends thereof in registration with said apertures and including means passing through one set of aligned apertures to pivotally connect said arm to said member,
   means formed at one end of said lever arm for receiving a load,
   a spring member secured to said base having means associated therewith for adjusting the force of said spring member and positioned for engagement by the other end of said lever arm,
   and sensing means adjacent said lever arm; whereby when the load exceeds the force of said spring said sensing means will be actuated.

2. A torque sensing device for a rotatable shaft comprising:
   a base plate adapted to be rigidly attached to the rotatable shaft, said plate having a shaft aperture at one end extending therethrough and connecting means adjacent said aperture and adapted for rigidly attaching said plate to the rotatable shaft for rotation therewith, a C-shaped spacer member secured to said plate and partially surrounding said aperture with the opened side thereof extending toward the other end of said plate, a spring member secured to and contiguous with said spacer member and having the ends thereof extending beyond the ends of said support member and forming a slot therebetween, adjusting means fastened to said plate for varying the force of said spring member, a lever arm pivotally connected intermediate the ends thereof to said plate and including means at one end for engaging said spring member and fastening means at the other end for connection to a load, and a pair of switches including plungers adjustably secured to said plate with said plungers positioned adjacent said one end of said lever arm; whereby when the load applied through said lever arm exceeds the resistant force of said spring the lever arm will rotate and actuate one of said switches.

3. The torque sensing device of claim 2 wherein said spring member adjusting means comprises:

a semi-circular support member partially encompassing said spring member and being radially spaced therefrom, slot means at each end of said support member, arcuate segments interposed within the space formed between said support and spring members and having bolt means thereon extending through said slot means, and fastening means operatively connected to said bolt means for adjustably positioning said segments about the periphery of said spring member.

4. The torque sensing device of claim 2 wherein said spring member comprises a flat sheet of beryllium copper.

References Cited by the Examiner

UNITED STATES PATENTS

| 1,461,825 | 7/23 | La Londe | 200—161 |
| 1,632,643 | 6/27 | Cobb et al. | 200—161 |
| 1,902,700 | 3/33 | Hadano | 200—153 |

BERNARD A. GILHEANY, *Primary Examiner.*

ROBERT K. SCHAEFER, *Examiner.*